United States Patent
Shah et al.

(10) Patent No.: US 12,004,147 B2
(45) Date of Patent: Jun. 4, 2024

(54) TRANSCEIVER DEVICE AND SCHEDULING DEVICE

(71) Applicant: PANASONIC INTELLECTUAL PROPERTY CORPORATION OF AMERICA, Torrance, CA (US)

(72) Inventors: Rikin Shah, Langen (DE); Ming-Hung Tao, Frankfurt am Main (DE); Ankit Bhamri, Rödermark (DE); Akihiko Nishio, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 391 days.

(21) Appl. No.: 17/406,984

(22) Filed: Aug. 19, 2021

(65) Prior Publication Data
US 2021/0385833 A1    Dec. 9, 2021

Related U.S. Application Data

(63) Continuation of application No. PCT/EP2020/052243, filed on Jan. 30, 2020.

(30) Foreign Application Priority Data

Feb. 22, 2019    (EP) .................................... 19158896

(51) Int. Cl.
*H04W 72/12*    (2023.01)
*H04W 72/0446*    (2023.01)
*H04W 72/1263*    (2023.01)
*H04W 72/21*    (2023.01)
*H04W 80/02*    (2009.01)

(52) U.S. Cl.
CPC ... *H04W 72/1263* (2013.01); *H04W 72/0446* (2013.01); *H04W 72/21* (2023.01); *H04W 80/02* (2013.01)

(58) Field of Classification Search
CPC ............................. H04W 72/21; H04L 5/0053
USPC .......................... 370/329, 328, 311; 455/522
See application file for complete search history.

(56) References Cited

U.S. PATENT DOCUMENTS

| | | |
|---|---|---|
| 2017/0142749 A1 | 5/2017 | Kim et al. |
| 2018/0227881 A1 | 8/2018 | Suzuki et al. |
| 2018/0242357 A1* | 8/2018 | Khirallah .............. H04L 1/1896 |

(Continued)

FOREIGN PATENT DOCUMENTS

WO    WO 2017026324 A1    2/2017

OTHER PUBLICATIONS

3GPP TS 36.211 V15.4.0, "$3^{rd}$ Generation Partnership Project; Technical Specification Group Radio Access Network; Evolved Universal Terrestrial Radio Access (E-UTRA); Physical channels and modulation (Release 15)," Dec. 2018, 240 pages.

(Continued)

*Primary Examiner* — Kiet M Doan
(74) *Attorney, Agent, or Firm* — Seed IP Law Group LLP

(57) ABSTRACT

The present disclosure provides a transceiver device, comprising circuitry, which, in operation, repeats, on a medium access control (MAC) layer, a scheduling request by instructing a transceiver to transmit the scheduling request on a plurality of opportunities of a physical uplink control channel (PUCCH). The transceiver, in operation, transmits the scheduling requests over the PUCCH.

7 Claims, 16 Drawing Sheets

(56) References Cited

U.S. PATENT DOCUMENTS

| | | | |
|---|---|---|---|
| 2018/0279363 A1* | 9/2018 | Su | H04W 74/0833 |
| 2018/0324872 A1 | 11/2018 | Babaei et al. | |
| 2019/0014505 A1* | 1/2019 | Kim | H04W 16/32 |
| 2019/0082493 A1* | 3/2019 | Lee | H04L 1/1874 |

OTHER PUBLICATIONS

3GPP TS 38.321 V15.4.0, "3rd Generation Partnership Project; Technical Specification Group Radio Access Network;NR;Medium Access Control (MAC) protocol specification (Release 15)," Dec. 2018, 77 pages.

3GPP TS 38.331 V15.4.0, "3$^{rd}$ Generation Partnership Project; Technical Specification Group Radio Access Network; NR; Radio Resource Control (RRC) protocol specification (Release 15)," Dec. 2018, 474 pages.

3GPP TR 38.811 V15.0.0, "3rd Generation Partnership Project; Technical Specification Group Radio Access Network; Study on New Radio (NR) to support non terrestrial networks (Release 15)," Jun. 2018, 119 pages.

3GPP TR 38.821 V0.3.0, "3$^{rd}$ Generation Partnership Project; Technical Specification Group Radio Access Network; Solutions for NR to support non-terrestrial networks (NTN) (Release 16)," Nov. 2018, 34 pages.

Extended European Search Report, dated Aug. 19, 2019, for corresponding European Application No. 19158896.1-1215, 12 pages.

International Search Report, mailed Mar. 27, 2020, for corresponding International Application No. PCT/EP2020/052243, 3 pages.

InterDigital Inc., "SR Resource Configuration in NR," R2-1708726, Agenda Item: 10.3.1.5, 3GPP TSG-RAN WG2 #99, Berlin, Germany, Aug. 21-25, 2017, 2 pages.

ITRI, "Discussion on SR configuration mapping," R2-1711764, Agenda Item: 10.3.1.5, 3GPP TSG-RAN WG2 Meeting #99bis, Prague, Czech Republic, Oct. 9-13, 2017, 3 pages.

Samsung, "SR handling in Rel-13 Enhanced Coverage MTC," R2-156815, Agenda Item: 7.4.6, 3GPP TSG-RAN WG2 Meeting #92, Anaheim, USA, Nov. 16-20, 2015, 3 pages.

Japanese Notice of Reasons for Rejection, dated Nov. 21, 2023, for Japanese Patent Application No. 2021-548627. (8 pages) (with English translation).

* cited by examiner

SchedulingRequestConfig information element

```
SchedulingRequestToAddMod ::=    SEQUENCE {
    schedulingRequestId     SchedulingRequestId,
    sr-ProhibitTimer        ENUMERATED {ms1, ms2, ms4, ms8, ms16, ms32, ms64, ms128}
    sr-TransMax             ENUMERATED { n4, n8, n16, n32, n64, spare3, spare2, spare1}
}
```

Fig. 4

LogicalChannelConfig information element

```
-- ASN1START
-- TAG-LOGICAL-CHANNEL-CONFIG-START

LogicalChannelConfig ::=            SEQUENCE {
    ul-SpecificParameters           SEQUENCE {
        priority                        INTEGER (1..16),
        prioritisedBitRate              ENUMERATED (kBps0, kBps8, kBps16, kBps32, kBps64, kBps128, kBps256, kBps512,
                                            kBps1024, kBps2048, kBps4096, kBps8192, kBps16384, kBps32768, kBps65536, infinity),
        bucketSizeDuration              ENUMERATED (ms5, ms10, ms20, ms50, ms100, ms150, ms300, ms500, ms1000,
                                            spare7, spare6, spare5, spare4, spare3, spare2, spare1),
        allowedServingCells             SEQUENCE (SIZE (1..maxNrofServingCells-1)) OF ServCellIndex    OPTIONAL,    -- PDCP-CADuplication
        allowedSCS-List                 SEQUENCE (SIZE (1..maxSCSs)) OF SubcarrierSpacing              OPTIONAL,    -- Need R
        maxPUSCH-Duration               ENUMERATED ( ms0p02, ms0p04, ms0p0625, ms0p125, ms0p25, ms0p5, spare2, spare1 )
                                                                                                       OPTIONAL,    -- Need R
        configuredGrantTypelAllowed     ENUMERATED (true)                                              OPTIONAL,    -- Need R
        logicalChannelGroup             INTEGER (0..maxLCG-ID)                                         OPTIONAL,    -- Need R
        schedulingRequestID             schedulingRequestId                                            OPTIONAL,    -- Need R
        number of SR repetition         ENUMERATED (n1, n2, n3, n4)
        logicalChannelSR-Mask           BOOLEAN,
        logicalChannelSR-DelayTimerApplied  BOOLEAN,
        ...,
        bitRateQueryProhibitTimer       ENUMERATED { s0, s0dot4, s0dot8, s1dot6, s3, s6, s12, s30}    OPTIONAL,    -- Need R
                                                                                                       OPTIONAL,    -- Cond UL
    }
    ...
}
```

Fig. 10

LogicalChannelConfig information element

```
LogicalChannelConfig ::=        SEQUENCE {
    ul-SpecificParameters       SEQUENCE {
        priority                    INTEGER (1..16),
        prioritisedBitRate          ENUMERATED {kBps0, kBps8, kBps16, kBps32, kBps64, kBps128, kBps256, kBps512,
                                    kBps1024, kBps2048, kBps4096, kBps8192, kBps16384, kBps32768, kBps65536, infinity},
        bucketSizeDuration          ENUMERATED {ms5, ms10, ms20, ms50, ms100, ms150, ms300, ms500, ms1000,
                                    spare7, spare6, spare5, spare4, spare3, spare2, spare1},
        allowedServingCells         SEQUENCE (SIZE (1..maxNrofServingCells-1)) OF ServCellIndex       OPTIONAL,   -- PDCP-CADuplication
        allowedSCS-List             SEQUENCE (SIZE (1..maxSCSs)) OF SubcarrierSpacing                 OPTIONAL,   -- Need R
        maxPUSCH-Duration           ENUMERATED { ms0p02, ms0p04, ms0p0625, ms0p125, ms0p25, ms0p5, spare2, spare1 }
                                                                                                      OPTIONAL,   -- Need R
        configuredGrantType1Allowed ENUMERATED {true}                                                 OPTIONAL,   -- Need R
        logicalChannelGroup         INTEGER (0..maxLCG-ID)                                            OPTIONAL,   -- Need R
        schedulingRequestID1        SchedulingRequestId1
        schedulingRequestID2        SchedulingRequestId2                                              OPTIONAL,   -- Need R
        logicalChannelSR-Mask       BOOLEAN,
        logicalChannelSR-DelayTimerApplied  BOOLEAN,
        ...,
        bitRateQueryProhibitTimer   ENUMERATED { s0, s0dot4, s0dot8, s1dot6, s3, s6, s12, s30 }       OPTIONAL,   -- Need R
    }                                                                                                 OPTIONAL,   -- Cond UL
}
```

Fig. 15

*LogicalChannelConfig* information element

```
LogicalChannelConfig ::=        SEQUENCE {
    ul-SpecificParameters           SEQUENCE {
        priority                        INTEGER (1..16),
        prioritisedBitRate              ENUMERATED {kBps0, kBps8, kBps16, kBps32, kBps64, kBps128, kBps256, kBps512,
                                            kBps1024, kBps2048, kBps4096, kBps8192, kBps16384, kBps32768, kBps65536, infinity},
        bucketSizeDuration              ENUMERATED {ms5, ms10, ms20, ms50, ms100, ms150, ms300, ms500, ms1000,
                                            spare7, spare6, spare5, spare4, spare3, spare2, spare1},
        allowedServingCells             SEQUENCE (SIZE (1..maxNrofServingCells-1)) OF ServCellIndex           OPTIONAL,     -- PDCP-CADuplication
        allowedSCS-List                 SEQUENCE (SIZE (1..maxSCSs)) OF SubcarrierSpacing                     OPTIONAL,     -- Need R
        maxPUSCH-Duration               ENUMERATED { ms0p02, ms0p04, ms0p0625, ms0p125, ms0p25, ms0p5, spare2, spare1 }
                                                                                                              OPTIONAL,     -- Need R
        configuredGrantTypelAllowed     ENUMERATED (true)                                                     OPTIONAL,     -- Need R
        logicalChannelGroup             INTEGER (0..maxLCG-ID)                                                OPTIONAL,     -- Need R
        schedulingRequestID1            SchedulingRequestId1                                                  OPTIONAL,     -- Need R
        schedulingRequestID2            SchedulingRequestId2
        number of SR repetition         ENUMERATED (n1, n2, n3, n4, n5)
        logicalChannelSR-Mask           BOOLEAN,
        logicalChannelSR-DelayTimerApplied BOOLEAN,
        ...
```

Fig. 21

TRANSCEIVER DEVICE AND SCHEDULING DEVICE

BACKGROUND

Technical Field

The present disclosure relates to transmission and reception of signals in a communication system. In particular, the present disclosure relates to methods and apparatuses for such transmission and reception.

Description of the Related Art

The 3rd Generation Partnership Project (3GPP) works at technical specifications for the next generation cellular technology, which is also called fifth generation (5G) including "New Radio" (NR) radio access technology (RAT), which operates in spectrum ranging from sub-1 GHz to millimeter wave bands. The NR is a follower of the technology represented by Long Term Evolution (LTE) and LTE Advanced (LTE-A).

For systems like LTE, LTE-A, and NR, further modifications and options may facilitate efficient operation of the communication system as well as particular devices pertaining to the system.

BRIEF SUMMARY

One non-limiting and exemplary embodiment facilitates providing reliable and low-latency requests for resource allocation.

In an embodiment, the techniques disclosed herein feature a transceiver device, comprising circuitry, which, in operation, repeats, on a medium access control, MAC, layer, a scheduling request by instructing a transceiver to transmit the scheduling request on a plurality of opportunities of a physical uplink control channel, PUCCH; and the transceiver, which, in operation, transmits the scheduling requests over the PUCCH.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following, exemplary embodiments are described in more detail with reference to the attached figures and drawings.

FIG. 4 shows the scheduling request configuration information element used for configuration of scheduling requests as defined in 3GPP TR 38.321

FIG. 10 shows an example of a NR logical channel configuration element including specification of a number of allowable scheduling request transmissions.

FIG. 15 illustrates a logical channel configuration element indicating a configuration according to an embodiment.

FIG. 21 illustrates a logical channel configuration element indicating a configuration according to an embodiment.

DETAILED DESCRIPTION

Figure 1:
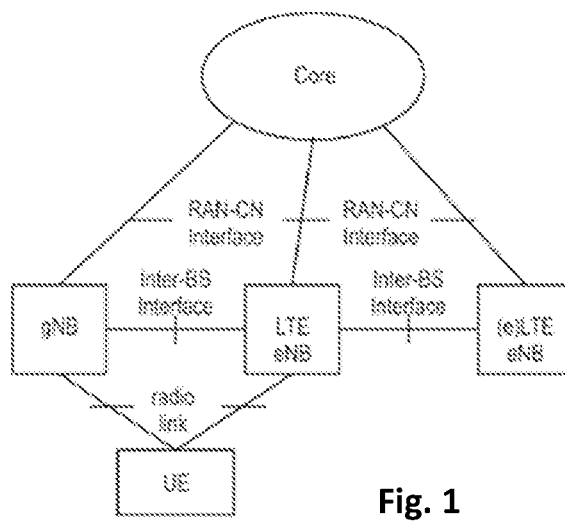
FIG. 1 shows an exemplary architecture for a 3GPP NR system including exemplary user and control plane architecture for the LTE eNB, gNB, and UE.

FIG. 1 shows an exemplary example of a communication system including a base station and a terminal and a core network. Such communication system may be a 3GPP system such as NR and/or LTE and/or UMTS. For example, as illustrated in FIG. 1, the base station (BS) may be a gNB (gNodeB, e.g., an NR base station) or an eNB (eNodeB, e.g., an LTE base station). However, the present disclosure is not limited to these 3GPP systems or to any other systems. Even though the embodiments and exemplary implementations are described using some terminology of 3GPP systems, the present disclosure is also applicable to any other communication systems, and in particular in any cellular, wireless and/or mobile systems.

The NR is planned to facilitate providing a single technical framework addressing several usage scenarios, requirements and deployment scenarios defined including, for instance, enhanced mobile broadband (eMBB), ultra-reliable low-latency communications (URLLC), massive machine type communication (mMTC), and the like. For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include scenarios with large number of devices with non-time critical data transfers such as smart wearables and sensor networks. The services eMBB and URLLC are similar in that they both demand a very broad bandwidth, however are different in that the URLLC service requires ultra-low latencies. In NR, the physical layer is based on time-frequency resources (such as Orthogonal Frequency Division Multiplexing, OFDM, similar to LTE) and may support multiple antenna operation.

A terminal is referred to in the LTE and NR as a user equipment (UE). This may be a mobile device such as a wireless phone, smartphone, tablet computer, or an USB (universal serial bus) stick with the functionality of a user equipment. However, the term mobile device is not limited thereto, in general, a relay may also have functionality of such mobile device, and a mobile device may also work as a relay.

A base station is a network node, e.g., forming a part of the network for providing services to terminals. A base station is a network node, which provides wireless access to terminals. Communication between the terminal and the base station is typically standardized. In LTE and NR, the wireless interface protocol stack includes physical layer, medium access layer (MAC) and higher layers. In control plane, higher-layer protocol Radio Resource Control protocol is provided. Via RRC, the base station can control configuration of the terminals and terminals may communicate with the base station to perform control tasks such as connection and bearer establishment, modification, or the like, measurements, and other functions.

Services for transfer of data provided by a layer to the higher layers are usually referred to as channels. For example, the LTE and the NR distinguish logical channels provided for higher layers by the MAC layer, transport channels provided by the physical layer to the MAC layer and physical channels which define mapping on the physical resources.

Logical channels are different kinds of data transfer services as offered by MAC. Each logical channel type is defined by what type of information is transferred. Logical channels are classified into two groups: Control Channels and Traffic Channels. Control channels are used for the transfer of control plane information only. Traffic channels are used for the transfer of user plane information only.

Logical Channels are then mapped by the MAC layer onto transport channels. For example, logical traffic channels and some logical control channels may be mapped onto the transport channel referred to as downlink shared channel DL-SCH in downlink and onto the transport channel referred to as uplink shared channel UL-SCH in uplink.

Non-Terrestrial Networks

In 3GPP, NR-based operation in a non-terrestrial network (NTN) is studied and described (see, e.g., 3GPP TR 38.811, Study on New Radio (NR) to support non-terrestrial networks, version 15.0.0, and 3GPP TR 38.821, Solutions for NR to support non-terrestrial networks, version 0.3.0).

Thanks to the wide service coverage capabilities and reduced vulnerability of space/airborne vehicles to physical attacks and natural disasters, NTNs may foster the rollout of NR service in unserved areas that cannot be covered by terrestrial NR networks (for instance isolated or remote areas, on board aircraft or vessels) and unserved (for instance suburban and rural areas). Further, NTNs may reinforce NR service reliability by providing service continuity for passengers on moving platforms or ensuring service availability anywhere, especially for critical communication.

The benefits relate to either non-terrestrial networks operating alone or to integrated terrestrial and non-terrestrial networks, which may impact coverage, user bandwidth, system capacity, service reliability or availability.

A non-terrestrial network refers to a network, or segment of networks using RF resources on board of a satellite, for instance. NTNs typically feature the following system elements: an NTN terminal, which may refer to a 3GPP UE or a terminal specific to the satellite system in case a satellite does not serve directly 3GPP UEs; a service link which refers to the radio link between the user equipment and the space/airborne platform; an airborne platform embarking a payload; gateways that connect the space/airborne platform to the core network; feeder links which refer to the radio links between the Gateway Center space/airborne platform.

Figure 2:
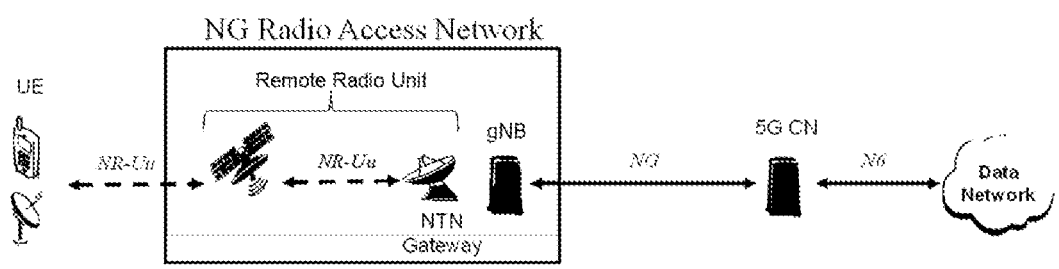
FIG. 2 shows a non-terrestrial network scenario with transparent satellite.

FIG. 2 illustrates a scenario of a non-terrestrial network, wherein a transmission between a terminal (UE) is performed via a remote radio unit including a geostationary satellite and an NTN gateway. A gNB is located at the gateway as a scheduling device. The satellite payload implements frequency conversion and radiofrequency amplifier in both uplink and downlink direction. Hence, the satellite repeats the NR radio interface from the feeder link (between the NTN gateway and the satellite) to the service link (between the satellite and the UE) and vice versa.

Figure 3:
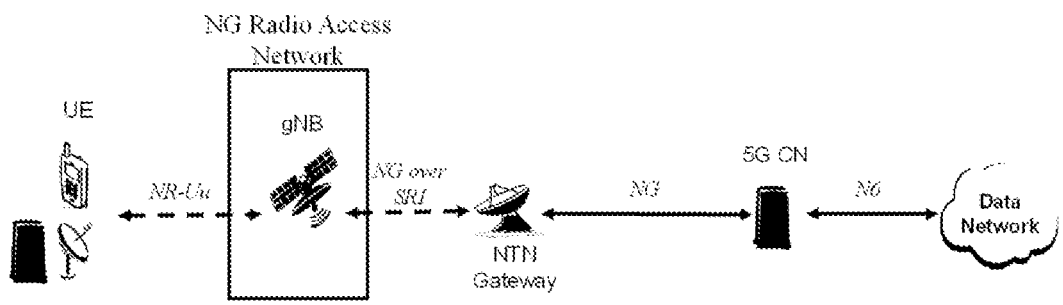
FIG. 3 shows a non-terrestrial network scenario where a gNB is implemented on a satellite.

FIG. 3 illustrates a scenario of a non-terrestrial network, wherein a transmission between a terminal (UE) is performed via a geostationary satellite including a gNB as a scheduling device.

Non-Terrestrial Networks and Round-Trip Delay

Every signal transmission based via electromagnetic waves is subject to a signal transmission delay due to the speed of light. In particular, twice the one-way propagation delay for a radio signal between a source and a destination is referred to as the round trip delay (RTD). A processing time at the processing node for a response signal to be generated may also be included in the RTD.

In particular, the round-trip delay depends on the distance between the source node, for instance, a terminal (UE), and a destination node. In NTNs, where signals are transmitted via a satellite or the like, the value of the RTD may be much larger than in terrestrial networks. For instance, in a case of a signal being transmitted via a satellite in geostationary orbit, that is, at approximately 35786 km altitude, the RTD may be as large as 541.14 ms in a case where a scheduling device, for instance, a gNB in NR, is located at a gateway, as illustrated in FIG. 2.

The scenario illustrated in FIG. 2 is associated with a round-trip delay of 541.14 ms and the scenario illustrated in FIG. 3 is associated with a round-trip delay of 271.57 ms. The round trip delay values for the scenarios illustrated in FIGS. 2 and 3 are summarized in table 1.

TABLE 1

| Reference scenario parameters | GEO based non-terrestrial access network (Scenario A and B) |
|---|---|
| Max Round Trip Delay (propagation delay only) | Scenario A: 541.14 ms (service and feeder links) |
| | Scenario B: 271.57 ms (service link only) |

Scheduling

In 3GPP, scheduling in NR-based operation is described (see, e.g., 3GPP TR 38.321, NR; Medium Access Control (MAC) protocol specification, version 15.4.0).

Scheduling is a central part of a communication system such as NR and/or LTE. For each time instance, a scheduler determines to which UE the shared time-frequency resources should be assigned. Uplink, downlink and/or sidelink transmissions may be scheduled.

In particular, an uplink scheduler may be responsible for dynamically controlling which terminals are to transmit on their uplink shared channel (UL-SCH). Each scheduled terminal is provided with a scheduling grant including a set of resources upon which the terminal should transmit its UL-SCH.

In other words, the function of the uplink scheduling is to dynamically determine which devices are to transmit and on which uplink resources. The dynamical scheduling is typically performed by means of a Physical Downlink Control CHannel (PDCCH). The physical downlink control channel carries scheduling grants and other control information which can also be referred to as Downlink Control Information, DCI. Each terminal (UE) monitors a PDCCH. This means that the UE (blindly) decodes certain resources referred to as a search space. PDCCH Search Space is an area in the downlink resource grid where PDCCH may be carried. The UE performs blind decoding in these search space trying to find PDCCH data (the DCI). In order to decode the PDCCH, the UE applies its own RNTI (Radio Network Temporary Identity) and tries to decode the PDCCH in the resources called control channel elements, CCEs. If the decoding is successful (which can be checked by an error detection code such as cyclic redundancy check), the DCI is received. The UE may also blindly try various parameter values for some selected transmission parameters. Each terminal may monitor more than one PDCCHs. The PDCCH may be common to a group of UEs (in which case, the UEs are using a common group RNTI) or dedicated to a particular UE.

The standard (LTE or NR) defines several different formats of DCI. These formats differ from each other according to their purpose. For example, formats for carrying uplink grant (such as formats 0 or 4) differ from formats which carry downlink grants or no grants at all. Moreover, there are different formats defined in accordance with the utilization of beamforming, broadcast/multicast or the like.

Correspondingly, in the uplink, the control information on physical layer is carried by a Physical Uplink Control Channel. PUCCH carries a set of parameters called UCI (Uplink Control Information). This is similar to PDCCH which carries the above mentioned DCI. Depending on the kind of information the UCI in PUCCH carries, PUCCH is also available in different formats. For example:

format 1 carries scheduling request, SR,
format 4 carries SR together with channel state information (CSI),
format 3 carries SR with HARQ acknowledgements (positive or negative) and CSI, There are further formats defined by the LTE and/or NR.

The basis for uplink scheduling are scheduling grants, containing providing the device information about the resources and an associated transport format to use for transmission of the UL-SCH. In other words, a DCI with a certain format (defined, for example, in standard) may carry resource allocation (RA) corresponding to the resource grant, as well as some further transmission parameters such as modulation and coding scheme (MCS), configuration for multiple input multiple output (MIMO) transmission or the like.

If a terminal has a valid grant, it is allowed to transmit its corresponding UL-SCH mapped onto the physical uplink shared channel (PUSCH) specified by the resource allocation.

That is, the scheduler needs knowledge about terminals having data to transmit and, therefor, needs to be scheduled uplink resources. There is no need to provide uplink resources to a device with no data to transmit, as this would result on the device performing padding to fill up the granted resources. Hence, the scheduler needs to know whether the device has data to transmit and should be given a grant.

Scheduling Requests

Scheduling requests may be used for terminals not having a valid scheduling grant. A scheduling request may be transmitted on a physical uplink control channel, PUCCH. Each terminal may be assigned a dedicated scheduling request resource, occurring every n-th subframe. A scheduling request may be a simple flag, raised (set) by the terminal to request uplink resources from the uplink scheduler. With a dedicated scheduling request mechanism, the identity of the requesting terminal does not have to be provided together with the scheduling request, as the identity of the terminal is implicitly known from the resources upon which the request is transmitted. These are configured by the scheduling node, such as the gNB, e.g., by a higher layer control protocol.

Upon reception of the scheduling request, the scheduling device can assign a scheduling grant to the terminal. If the terminal receives a scheduling grant, it transmits its data in the scheduled resources. The data to be transmitted on the PUSCH may include, at first buffer status which notified the scheduling node of the amount of data the UE has to transmit. Based on the buffer status, the scheduling node may then schedule the actual data resources on the PUSCH. However, this is only an option and, in general, data resources may also be scheduled directly. In some system it is also possible to associate a scheduling request with a particular amount of data requested to be scheduled.

If the terminal does not receive a scheduling grant until the next possible instant, the scheduling request may be repeated.

Therefore, a contention-free scheduling-request mechanism on the PUCCH is provided, wherein each terminal in the cell is given a reserved resource on which it can transmit a request for uplink resources.

A UE MAC entity may be configured with zero, one, or more SR configurations. An SR configuration consists of a set of PUCCH resources for scheduling requests across different bandwidth parts (BWP). For a logical channel (LCH), at most one PUCCH resource for SR is configured per BWP. Each SR configuration corresponds to one or more logical channels. Mapping between logical channels and SR configurations may be configured by Radio Resource Control (RRC) messaging.

An SR procedure may be started when a regular buffer status reporting (BSR) is triggered but uplink radio resources to transmit the BSR are not available in the UE, as mentioned above. During the SR procedure, the UE may perform either transmission of the SR over the PUCCH or initiate a random access (RA) procedure, depending on whether the UE is configured with the PUCCH resource for SR or not. The RA procedure is initiated only when the PUCCH resource for SR is not configured.

When the UE MAC entity has an SR transmission location on the valid PUCCH resource for SR configured, the physical layer (PHY) is instructed to signal the SR on one valid PUCCH resource for SR. Subsequently, an SR prohibit timer this started (sr_prohibitTimer). At the time of a successive SR transmission occasions, the MAC does not instruct the PHY to signal the SR if the SR prohibit timer is running.

In NR, SR resources are configured with certain periodicity. Once the SR is transmitted by the UE, the SR prohibit timer is initiated and no SR is sent on the already configured resources as long as the SR prohibit timer is running.

The scheduling request configuration information element used for configuration of scheduling requests as defined in 3GPP TS 38.331, ("NR; Radio Resource Control (RRC); Protocol specification," version 15.4.0, section 6.3.2) is shown in the following as well as in FIG. 4.

When the SR prohibit timer is running, no SR transmission is triggered by UE MAC in opportunities successive to the opportunity used for SR transmission. Although in FIG. 5, a periodicity of SR transmission opportunities is each slot n of successive frames, SR configuration periodicity is not limited to this and any other periodicity may be configured.

Scheduling Requests and Round-Trip Delay

As indicated above, in an NTN, the round trip delay is large, such that a scheduling grant transmitted by a scheduling device, e.g., gNB in NR, in response to reception of an SR may not be received by the terminal when the SR prohibit timer has expired. That is, the SR prohibit timer should be configured under consideration of the round-trip delay.

However, when the SR prohibit timer is extended to account for a large round trip delay, and a transmitted SR is lost, a retransmission of the SR is performed by UE after the SR prohibit timer expires. As a result, it may take a long time for UE to obtain uplink resources such that the latency of transmissions in an NTN becomes large.

Further, as in NTNs the cell size may be large, a single cell serves a large number of users. As a result, radio resources for transmission on the NTN are tight. That is, the limited radio resources are used by a large number of devices compared to transmissions over, for instance, terrestrial networks.

Figure 5:
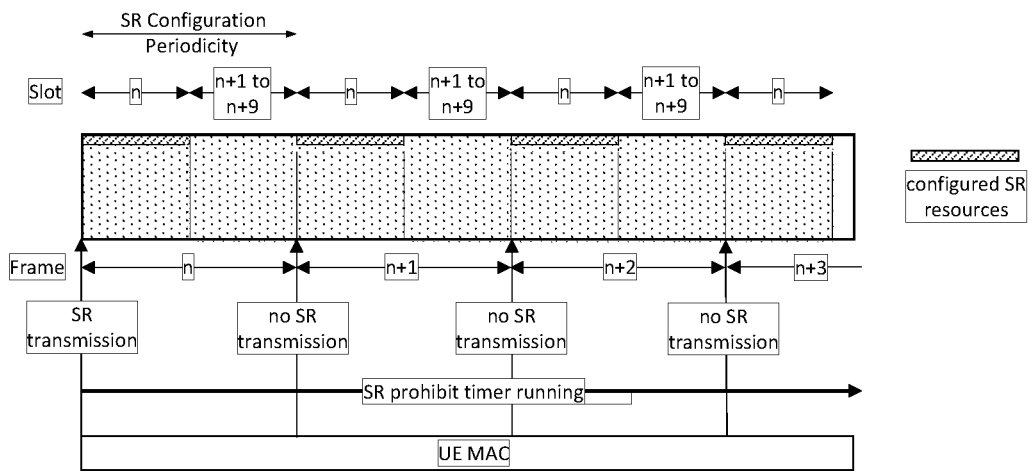
FIG. 5 illustrates transmission of scheduling requests configured with certain periodicity.

Taking account of an enlarged round-trip delay in NTNs compared to terrestrial networks by increasing the SR prohibit timer and, at the same time, repetitively transmitting scheduling requests in order to provide a low latency of transmissions, additional resources could be configured for complete PUCCH retransmission on the physical layer. This is illustrated in FIG. 5.

Figure 6:
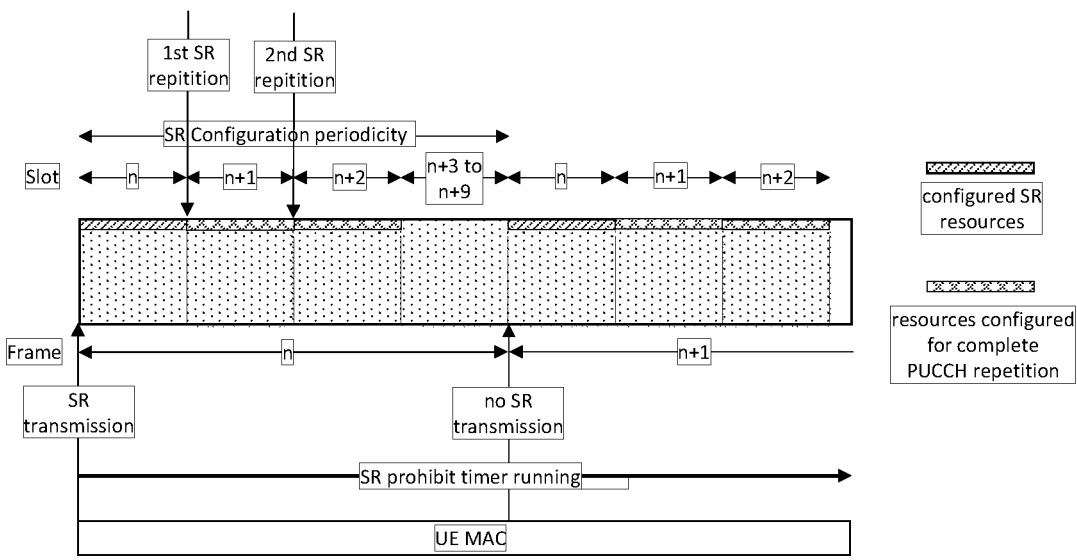
FIG. 6 is a schematic illustration of repetitive transmission of a scheduling request by PUCCH repetition.

FIG. 6 is a schematic illustration of repetitive transmission of a scheduling request by PUCCH repetition. In particular resources may be reserved for repetition of the entire PUCCH on the physical layer. The PUCCH may, in addition to the SR, contain further information like a hybrid automatic repeat request, HARQ, and/or channel state information, CSI. That is, when repetition is done through entire

| SchedulingRequestConfig Information Element |
|---|
| SchedulingRequestToAddMod ::=     SEQUENCE { <br>    schedulingRequestId     SchedulingRequestId, <br>    sr-ProhibitTimer     ENUMERATED {ms1, ms2, ms4, ms8, ms16, ms32, ms64, ms128} <br>    sr-TransMax     ENUMERATED {n4, n8, n16, n32, n64, spare3, spare2, spare1} <br> } |

In particular, the scheduling request prohibit timer is configured by sr-ProhibitTimer and indicates a time duration during which a scheduling request is not to be transmitted after transmission of a SR, even if no scheduling grant has been received. A maximum number of scheduling requests is defined by sr-TransMax. Sr-ProhibitTimer and sr-TransMax are provided from the scheduling node to the UE, e.g., via RRC signaling.

FIG. 5 illustrates transmission of scheduling requests configured with certain periodicity. In this example, opportunities for transmission of an SR are configured within every slot n of subsequent frames, each of the frames including slots n to n+9. As soon as an SR transmission has been instructed by the UE on the MAC layer, the SR prohibit timer is started, as indicated with a bold arrow in FIG. 5.

PUCCH repetition on the physical layer, additional resources are needed, resulting in significantly higher overhead. Since the NTN cell size is usually large with a large number of UEs to be served, a high amount of resources would have to be reserved in order to provide repetitive SR transmission.

The present disclosure provides techniques which may facilitate for increasing the reliability by repetitive transmission of an SR without the need for additional resources to be configured for repetition. Further, the present disclosure provides techniques without the need for additional overhead.

For this purpose, in the embodiments of communication methods and communication devices described in the following, a transceiver device repeats a scheduling request on a medium access control (MAC) layer by instructing a transmission of the scheduling grant on a plurality of opportunities of a PUCCH. The scheduling requests are transmitted by the receiver over the PUCCH.

Figure 7:
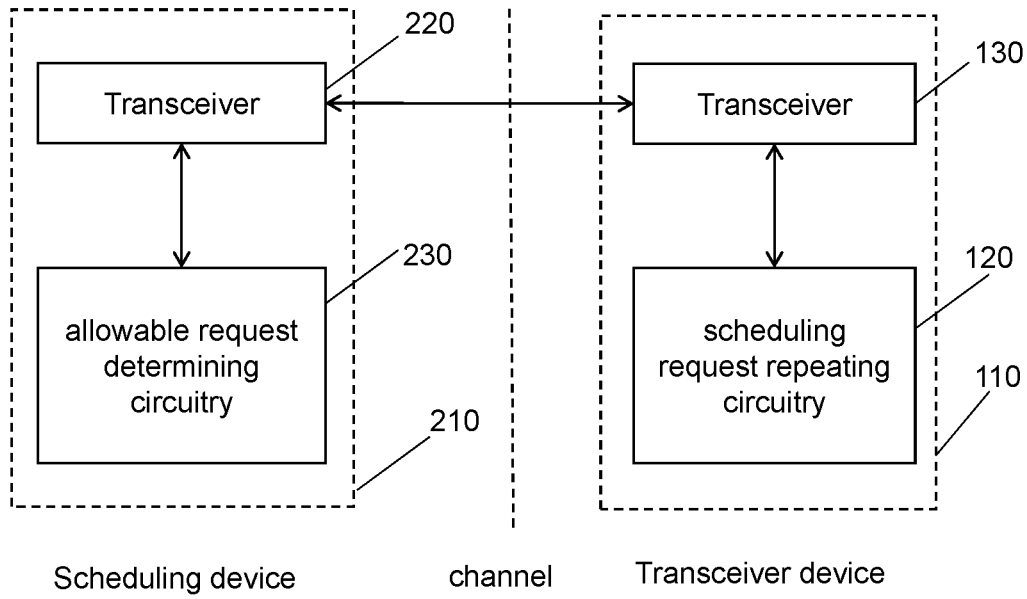
FIG. 7 is a block diagram showing the functional components of a scheduling device and a transceiver device according to an embodiment.

The disclosure provides a transceiver device and a scheduling device shown in FIG. 7. The transceiver device 110 comprises circuitry 120 (or processing circuitry), which, in operation, repeats, on a medium access control, MAC, layer, a scheduling request by instructing a transceiver to transmit the scheduling request on a plurality of opportunities of a physical uplink control channel, PUCCH. Further, the transceiver device 110 comprises a transceiver 130 (a transmitter and/or receiver comprising hardware component(s) such as one or more antennas and control circuitry which controls operation of the hardware components), which, in operation, transmits the scheduling requests over the PUCCH.

For instance, the transceiver device 110 is a UE in an NR NTN. Accordingly, the transceiver 130 and circuitry 120 also reserved to this disclosure as "UE transceiver" and "UE circuitry." However, these terms are merely used to distinguish the circuitry 120 and the transceiver 130 from circuitry and transceiver(s) comprised by other devices such as a scheduling device or a base stations. The transceiver device 110 may be a terminal device, relay device, or communication device of a similar communication system. The UE circuitry may be considered or include "scheduling request repeating circuitry."

Further provided is a scheduling device 210 (or scheduling node) shown in FIG. 7, comprising circuitry 230, which, in operation, determines an allowable request indicator indicating an allowable number of scheduling requests and a transceiver 220, which, in operation, transmits the allowable request indicator.

Alternatively, the scheduling device 210 (or scheduling node) may comprise circuitry 230, which, in operation, determines a scheduling request configuration indicator indicating a plurality of scheduling request configurations and a transceiver 220, which, in operation, transmits the scheduling request configuration indicator.

For instance, the scheduling device is a network node (base station) in an NR NTN system (a gNB) or in a similar wireless communication system. The circuitry 220 is also referred to as "allowable request determining circuitry" or "scheduling request configuration determining circuitry," to distinguish it from other circuitry such as the UE circuitry 120, "network node circuitry."

Further provided is a method, comprising repeating, on a medium access control, MAC, layer, a scheduling request by instructing a transmission of the scheduling request on a plurality of opportunities of a physical uplink control channel, PUCCH, and transmitting the scheduling request over the PUCCH.

Further provided is a method comprising determining an allowable request indicator indicating an allowable number of scheduling requests; and transmitting the allowable request indicator.

Further provided is a method comprising determining a scheduling request configuration indicator indicating a plurality of scheduling request configurations; and transmitting the scheduling request configuration indicator In the further description, the details and embodiments apply to each of the transceiver device 110, the scheduling nodes (or scheduling device) 210, and the methods unless explicit statement or the context indicates otherwise.

The UE circuitry 120 of the transceiver device repeats transmission of a scheduling request on a MAC layer. This is performed by instructing the transceiver 130 to transmit the scheduling request on multiple opportunities of a PUCCH configured for transmission of SRs. In this way, repetitive SR transmission is performed by the transceiver device, such that the reliability is increased by the repetition while at the same time no additional resources need to be configured for repetition. Therefore, no additional overhead with respect to repetition of the entire PUCCH is generated.

In other words, the transmission of a scheduling request on a resource configured for the transmission of a scheduling is triggered by a MAC layer entity. That is, the physical layer (PHY) is instructed to transmit the scheduling request on an opportunity for SR transmission. The MAC layer entity repeats instructing the PHY to transmit the scheduling request on resources configured for SR transmission, for instance, by RRC messaging. In other words, repetitive instructions for transmission of the SR are provided by the MAC layer to the physical layer, for instance, by internal signaling of the UE.

A particular benefit of MAC layer SR repetition is that the repetition can be done on per logical channel basis and therefore, SR repetition is required only for one of the multiple logical channels. MAC may trigger the repetition only for one instead for all of them. However, in PHY layer PUCCH repetition, it is not possible to trigger repetition for certain logical channels, but for all of them.

For example, in NR, a UE may be configured by a higher layer parameter with a set of configurations for SR in a PUCCH transmission using either PUCCH format 0 or PUCCH format 1.

Further, for PUCCH formats 1, 3, or 4, a UE can be configured with a number of slots for repetition of a PUCCH transmission.

Still further, 3GPP TS 38.331 ("NR; Radio Resource Control (RRC); Protocol specification," version 15.4.0), section 6.3.2 describes an identifier of the PUCCH resource and a parameter related to PUCCH format and a number of slots for SR transmission. If a PUCCH format 1 is configured for SR and the number of slots is set to a number larger than 1, UE performs SR repetition based on a single SR configuration.

In some embodiments, the scheduling device 210 determines an allowable request indicator which indicates an allowable number of scheduling requests. That is, the scheduling device 210 indicates to the transceiver device a maximum number of repetitive transmissions of scheduling requests, and the transceiver device 110, or specifically, the circuitry 120, repetitively instructs the transceiver 130 to transmit the scheduling requests on opportunities configured for SR transmission, wherein the scheduling requests are transmitted according to the maximum number of repetitive transmissions indicated by the scheduling device 210. In other words, transmissions of scheduling requests are triggered by the UE MAC entity until the number of transmitted SRs is equal to the configured maximum (allowable) number of SR transmissions.

The number of transmitted scheduling requests is not limited to be determined according to an allowable number of scheduling requests received from us scheduling device 210, but may be the transceiver's decision.

In some embodiments, the scheduling device 210 determines a scheduling request configuration indicator indicating a plurality of scheduling request configurations per logical channel. That is, a logical channel may be mapped on multiple SR configurations. The transceiver device 11, or specifically, the circuitry 120, instructs the transceiver 130 to transmit the scheduling requests according to the multiple SR configurations.

Figure 8:
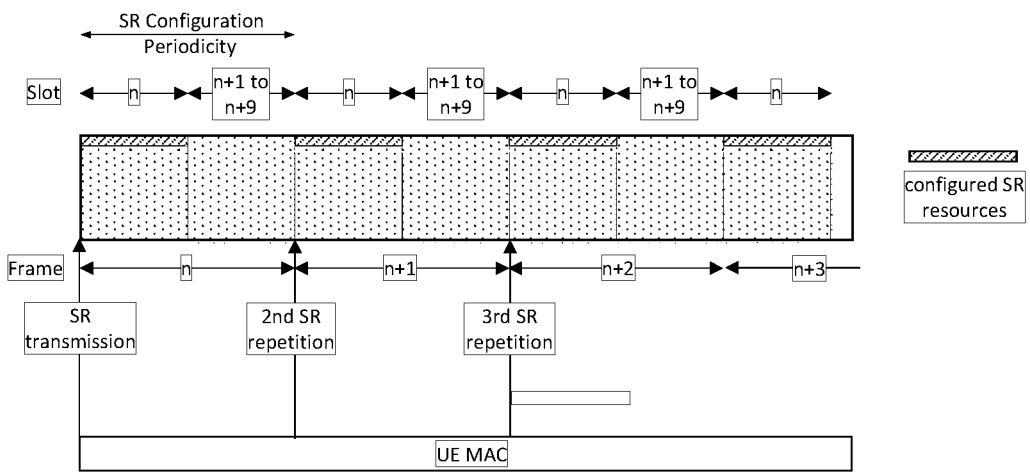
FIG. 8 is a schematic illustration of transmission of a scheduling request on multiple opportunities triggered on a MAC layer according to an embodiment.

FIG. 8 is a schematic illustration of repeated transmission of a scheduling request on multiple opportunities triggered by the UE circuitry 120 on a MAC layer, according to an embodiment. As shown in the figure, in this example, SR transmission is triggered by the UE MAC layer three times with a configured periodicity. In particular, the SR is transmitted via a PUCCH on multiple opportunities. The opportunities being resources configured for SR transmission, on which the transceiver device 110 may transmit a resource requests in a case where the transceiver device 110 has data to be transmitted without having been assigned resources for uplink transmission via a UL-SCH, as indicated above.

Repetition Based on Single SR Configuration per LCH

Figure 9:
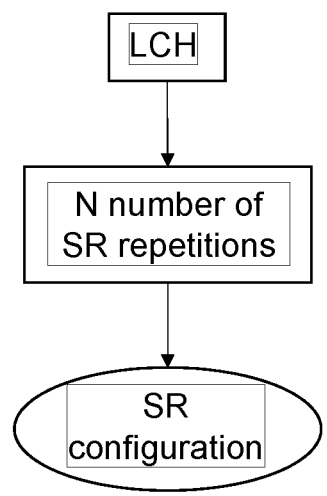
FIG. 9 schematically illustrates mapping of a single scheduling request configuration per logical channel.

In some embodiments, the scheduling device 210 may configure a number N of SR repetitions per logical channel, wherein each logical channel is mapped to one SR configuration, as shown in FIG. 9.

The allowable number of scheduling requests may be configured in a NR logical channel configuration element, as shown in the following as well as FIG. 10.

logical channels may be configured as allowing more SR repetitions in comparison to lower priority logical channels.

Figure 11:
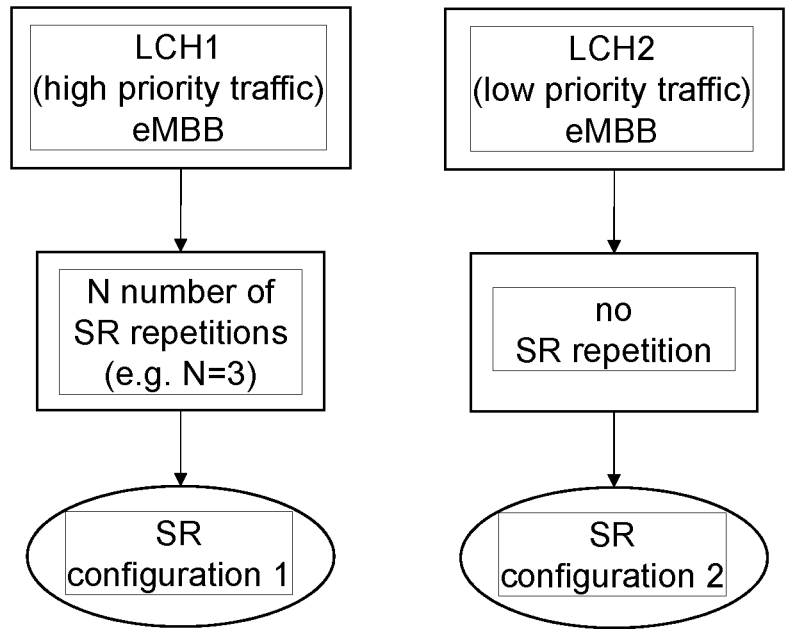
FIG. 11 illustrates a number of SR transmissions being configured for a high priority logical channel, while for a low priority logical channel, no SR repetition is configured.

As shown in FIG. 11, the number of SR transmissions may be configured for a high priority logical channel (e.g., high priority eMBB traffic) while for a low priority channel (low priority eMBB traffic), no SR repetition may be configured. Therefore, the value of SR repetition may be different depending on the priority of the logical channel.

In addition or alternatively, the number of allowable repetitions can be configured based on uplink channel quality. The uplink channel quality may be assessed, for instance, utilizing sounding reference signals (SRS). Sounding reference signals are transmitted by terminals to a scheduling device in order to enable the scheduling device to perform channels sounding, for example to support frequency domain scheduling (e.g., see 3GPP TS 36.211, "Evolved Universal Terrestrial Radio Access (E-UTRA); Physical channels and modulation," version 15.4.0, section 5.5.3).

Figure 12:
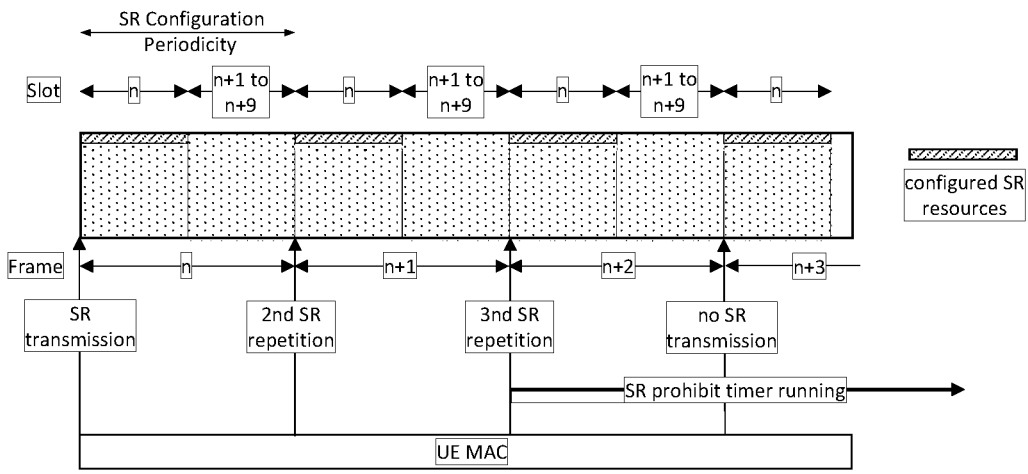
FIG. 12 is a schematic illustration of transmission of a scheduling request on multiple opportunities triggered on a MAC layer according to an embodiment, wherein a scheduling request prohibit timer is started after transmission of a scheduling request on multiple opportunities.

FIG. 12 is a schematic illustration of transmission of a scheduling request on multiple opportunities triggered on a MAC layer according to an embodiment, wherein a sched-

```
                        LogicalChannelConfigInformation Element

-- ASN1START
-- TAG-LOGICAL-CHANNEL-CONFIG-START
LogicalChannelConfig ::=            SEQUENCE {
    ul-SpecificParameters              SEQUENCE {
        priority                          INTEGER (1..16),
        prioritisedBitRate                ENUMERATED {kBps0, kBps8, kBps16, kBps32, kBps64,
                                             kBps128, kBps256, kBps512,
                                             kBps1024, kBps2048, kBps4096, kBps8192, kBps16384,
                                             kBps32768, kBps65536, infinity},
        bucketSizeDuration                ENUMERATED {ms5, ms10, ms20, ms50, ms100, ms150,
                                             ms300, ms500, ms1000, spare7, spare6, spare5,
                                             spare4, spare3,spare2, spare1},
        allowedServingCells               SEQUENCE (SIZE (1..maxNrofServingCells-1)) OF
                                             ServCellIndex      OPTIONAL,   -- PDCP-CADuplication
        allowedSCS-List                   SEQUENCE (SIZE (1..maxSCSs)) OF SubcarrierSpacing
                                             OPTIONAL,   -- Need R
        maxPUSCH-Duration                 ENUMERATED { ms0p02, ms0p04, ms0p0625, ms0p125,
                                             ms0p25, ms0p5, spare2, spare1 }
                                             OPTIONAL,   -- Need R
        configuredGrantType1Allowed       ENUMERATED {true}
                                             OPTIONAL,   -- Need R
        logicalChannelGroup               INTEGER (0..maxLCG-ID)
                                             OPTIONAL,   -- Need R
        schedulingRequestID               SchedulingRequestId
                                             OPTIONAL,   -- Need R
        number of SR repetition           ENUMERATED (n1, n2, n3, n4)
        logicalChannelSR-Mask             BOOLEAN,
        logicalChannelSR-DelayTimerApplied    BOOLEAN,
        ...,
        bitRateQueryProhibitTimer         ENUMERATED { s0, s0dot4, s0dot8, s1dot6, s3, s6,
                                             s12, s30}
                                             OPTIONAL    -- Need R
    }                                     OPTIONAL,   -- Cond UL
    ...
}
```

In particular, the number of repetitions of scheduling request transmissions may be configured via an additional parameter, which is, in the example illustrated in FIG. 10 and above, indicated as "number of SR repetitions."

Each logical channel may allow a repetition of SR transmission, wherein the number of SR repetitions is configured by a scheduling device, e.g., a gNB via RRC message (e.g., see 3GPP 38.331, version 15.4.0). For example, the number of SR repetitions may be configured differently based on the priority of logical channels. For example higher priority uling request prohibit timer is started after transmission of a scheduling request multiple times.

In particular, a scheduling device may configure N allowable scheduling request transmissions per logical channel. Transmission of a scheduling request is triggered by the UE MAC layer entity in each slot n of three successive frames n to n+2. After transmission of the third scheduling request, the SR prohibit timer is started, and no SR transmission is triggered on opportunities configured for SR transmission as long as the SR prohibit timer has not expired. In the example illustrated in FIG. 12, three transmissions of SR are triggered by UE MAC layer entity. However, the present disclosure is not limited to three transmissions, but any number configured by the scheduling device may serve as a maximum number of SR transmission repetitions. In this case, the SR prohibit timer is initiated after transmission of the last SR.

Figure 13:
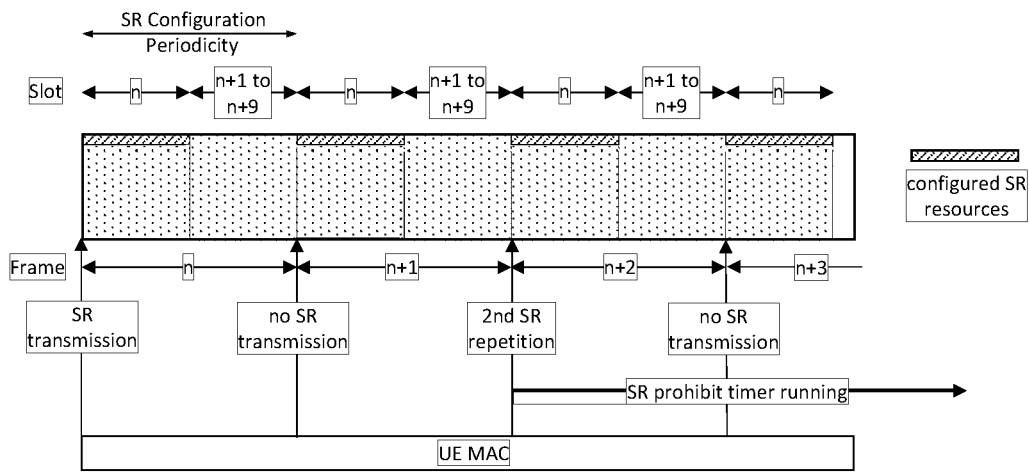
FIG. 13 is a schematic illustration of transmission of a scheduling request on multiple opportunities triggered on a MAC layer according to an embodiment, wherein a scheduling request prohibit timer is started after transmission of a scheduling request multiple times and a periodicity in slot n of every second frame is applied.

Additionally or alternatively, UE may use a different periodicity for transmission of scheduling requests. FIG. 13 is a schematic illustration of transmission of a scheduling request on multiple opportunities triggered on a MAC layer according to an embodiment, wherein a scheduling request prohibit timer is started after transmission of a scheduling request multiple times and a periodicity in slot n of every second frame is applied.

In particular, a scheduling device may configure N allowable scheduling request transmissions per logical channel. In the example illustrated in FIG. 13, N is equal to two and transmission of a scheduling request is triggered by the UE MAC layer entity in each slot n of two frames n and n+2. After transmission of the second scheduling request, the SR prohibit timer is started, and no SR transmission is triggered on opportunities configured for SR transmission as long as the SR prohibit timer has not expired.

In a case when the UE receives an uplink grant from the scheduling device, the SR prohibit timer is terminated. Further, when the SR prohibit timer is expired, and no uplink grant has been received from a scheduling device, the process of scheduling request transmission may be restarted. That is, they UE MAC layer entity again triggers transmission of SR on multiple opportunities of a PUCCH.

It is a particular advantage of this approach that the reliability is increased and the latency for uplink data transmission is reduced. In particular, if the scheduling device, e.g., gNB, does not receive the first SR transmission from UE, the second or third SR transmission may be received by the scheduling device and a resource grant may be transmitted to the transceiver device even through the SR prohibit timer has not yet expired.

Figure 14:
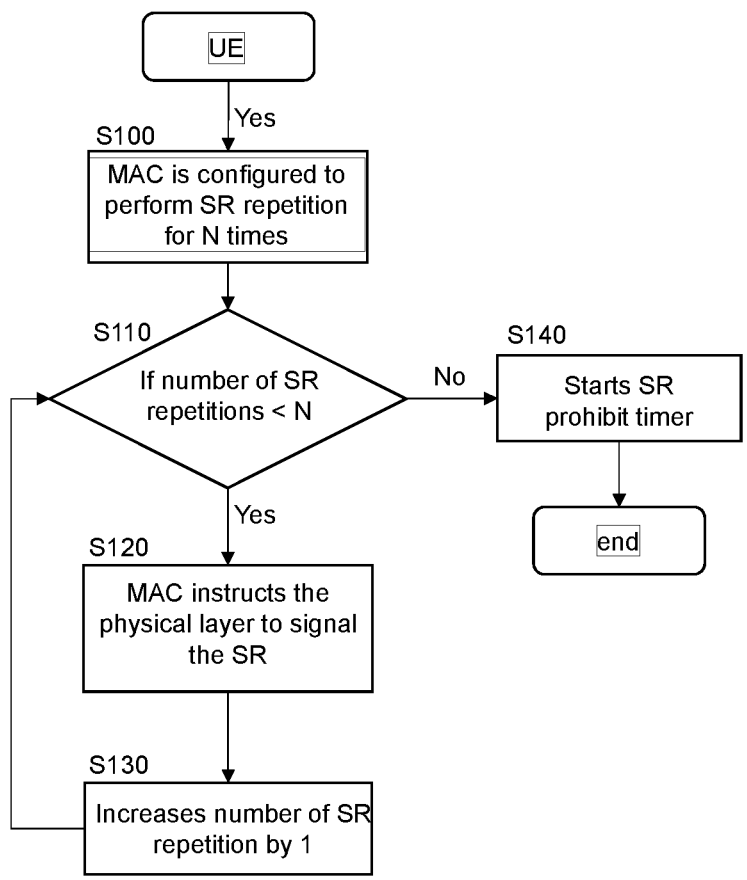
FIG. 14 is a flowchart illustrating transmission of a scheduling request on multiple opportunities according to an embodiment.

FIG. 14 is a flowchart illustrating transmission of a scheduling request on multiple opportunities according to an embodiment. In step S100, the UE MAC layer entity is configured to perform SR repetition for N times. This may be performed by reception of RRC configurations indicating the repetition pattern of resources configured as opportunities for transmission of scheduling requests. In step S110 it is determined whether the number of scheduling requests transmitted so far is below the configured number N of SR transmission repetitions. In a case, where the number of SR transmissions is equal to or above said configured number N of SR transmission repetitions (No is step S110), the SR prohibit timer is started in step S140. In a case where it is determined that the number of SR transmission repetitions is below the configured number N of SR transmission repetitions, the UE MAC layer entity instructs the physical layer (the transceiver) to signal the SR on a configured opportunity of a PUCCH. Further, in step S130 the number of SR transmission repetitions is increased by one and the procedure returns to step S110. In particular, the number of scheduling requests transmitted without having received a scheduling grant may be kept track of by UE using a counter, for instance, SR_COUNTER of the logical channel configuration in NR.

Repetition Based on Multiple SR Configurations per LCH

Figure 16:
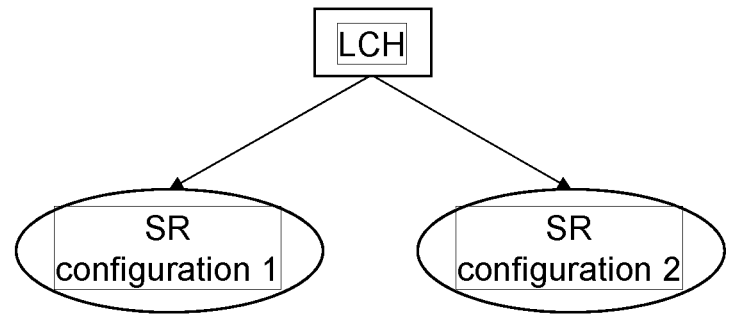
FIG. 16 schematically illustrates mapping of two scheduling request configuration per logical channel.

In some embodiments, the scheduling device 210 may configure multiple SR configurations per logical channel, wherein each logical channel is mapped to multiple SR configurations. For instance, as shown in FIG. 16, a LCH is mapped to two SR configurations indicated as configurations 1 and 2. In other words, multiple opportunities for SR transmission are provided via multiple SR configuration per logical channel and SR repetitions are based on the different SR configurations.

Although in FIG. 16, a LCH is mapped to two SR configurations, the present invention is not limited to this, and an LCH may be mapped to more than two SR configurations.

A logical channel configuration information element defining the configuration of a logical channel in NR, wherein a LCH is mapped to two scheduling request configurations via a second scheduling request ID "schedulingRequestID2" is shown in the following as well as FIG. 15.

| LogicalChannelConfig Information Element | |
|---|---|
| LogicalChannelConfig ::= | SEQUENCE { |
| ul-SpecificParameters | SEQUENCE { |
| priority | INTEGER (1..16), |
| prioritisedBitRate | ENUMERATED {kBps0, kBps8, kBps16, kBps32, kBps64, kBps128, kBps256, kBps512, kBps1024, kBps2048, kBps4096, kBps8192, kBps16384, kBps32768, kBps65536, infinity}, |
| bucketSizeDuration | ENUMERATED {ms5, ms10, ms20, ms50, ms100, ms150, ms300, ms500, ms1000, spare7, spare6, spare5, spare4, spare3, spare2, spare1}, |
| allowedServingCells | SEQUENCE (SIZE (1..maxNrofServingCells-1)) OF ServCellIndex    OPTIONAL,   -- PDCP-CADuplication |
| allowedSCS-List | SEQUENCE (SIZE (1..maxSCSs)) OF SubcarrierSpacing OPTIONAL,   -- Need R |
| maxPUSCH-Duration | ENUMERATED {ms0p02, ms0p04, ms0p0625, ms0p125, ms0p25, ms0p5, spare2, spare1 } OPTIONAL,   -- Need R |
| configuredGrantTypeIAllowed | ENUMERATED {true} OPTIONAL,   -- Need R |
| logicalChannelGroup | INTEGER (0..maxLCG-ID) OPTIONAL,   -- Need R |
| schedulingRequestID1 | SchedulingRequestId1 OPTIONAL, -- Need R |
| schedulingRequestID2 | SchedulingRequestId2 |
| logicalChannelSR-Mask | BOOLEAN, |

| LogicalChannelConfig Information Element |
| --- |
| logicalChannelSR-DelayTimerApplied    BOOLEAN,<br>bitRateQueryProhibitTimer    ENUMERATED { s0, s0dot4, s0dot8, sldot6, s3, s6,<br>    s12, s30}<br>    OPTIONAL -- Need R<br>}    OPTIONAL, -- Cond UL |

The scheduling device may determine whether multiple SR configurations are configured for a LCH based on the priority of the LCH. For example, a higher priority LCH may be mapped to more than one SR configuration. With this approach, scheduling request procedures of logical channels with a high priority are improved in terms of reliability and latency.

Figure 17:
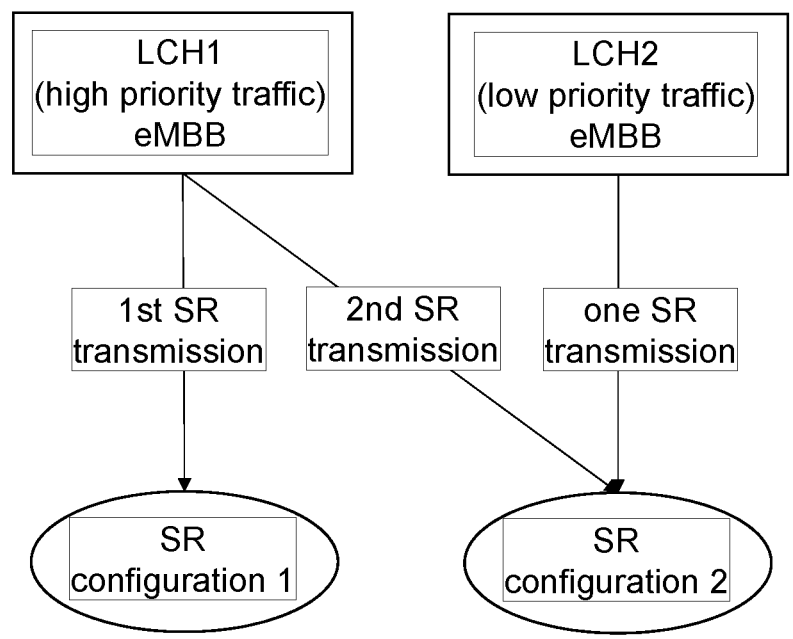
FIG. 17 shows an example, where a high priority logical channel is mapped to a SR configuration 1 and SR configuration 2, whereas a low priority logical channel is mapped to SR configuration 2 only.

FIG. 17 shows an example, where a high priority logical channel (e.g., high priority eMBB traffic) is mapped to a SR configuration 1 and SR configuration 2 in order to repeat SR transmission, whereas a low priority logical channel (e.g., low priority eMBB traffic) is mapped to only SR configuration 2.

Figure 18:
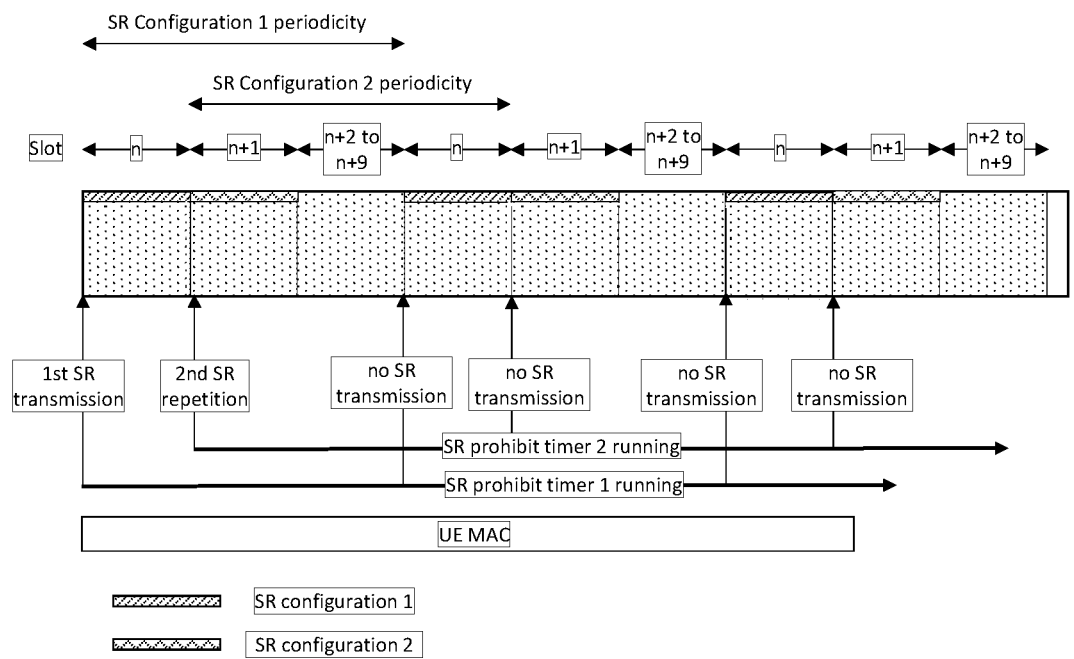
FIG. 18 is a schematic illustration of transmission of a scheduling request on multiple opportunities triggered on a MAC layer according to an embodiment, wherein transmission of a scheduling is triggered on opportunities according to two scheduling request configurations.

FIG. 18 is a schematic illustration of transmission of a scheduling request on multiple opportunities triggered by on the UE MAC layer according to an embodiment, wherein transmission of a scheduling is triggered on multiple opportunities according to two scheduling request configurations.

In particular, a first transmission of a scheduling request is triggered on the UE MAC layer according to the first SR configuration with associated first periodicity in slot n. After said first SR transmission, a first SR prohibit timer is initiated and the UE MAC layer does not trigger SR transmission according to the first SR configuration as long as the first SR prohibit timer has not expired. Further, a second transmission of a scheduling request is triggered on the UE MAC layer according to the second SR configuration with associated second periodicity in slot n+1. After said second SR transmission, a second SR prohibit timer is initiated and the UE MAC layer entity does not trigger SR transmission according to the second SR configuration as long as the second SR prohibit timer is not expired.

In the example illustrated in FIG. 18, two transmissions of SR are triggered on the UE MAC layer according to the two SR transmission configurations. However, the present disclosure is not limited to two transmissions, but any number of SR transmission configurations may be configured by the scheduling device. In this case, an SR prohibit timer may be initiated for every SR transmission after triggering the transmission of the SR according to respective SR configuration.

In a case when the UE receives an uplink grant from the scheduling device, the SR prohibit timers are stopped/terminated. Further, when one of the SR prohibit timers has expired, and no uplink grant has been received from the scheduling device, repetitive transmission of SR according to the corresponding SR configuration is restarted. That is, transmission of SR on respective opportunities of a PUCCH are again instructed on the UE MAC layer.

It is a particular advantage of this approach that the reliability is increased and the latency for uplink data transmission is reduced. In particular, if the scheduling device, e.g., gNB, does not receive the first SR transmission from UE, the second SR transmission may be received by the scheduling device and a resource grant may be transmitted to the transceiver device even through the SR prohibit timers have not yet expired.

Further, if one configuration between the transceiver device, e.g., UE, and the scheduling device, e.g., gNB, is misaligned, the second SR configuration may still be used.

Another benefit lies in terms of latency. In a case of a single SR configuration, for example, with SR periodicity after every k slot, repetition will be performed at the earliest after every k slots. In a case of multiple SR configurations, the resource for SR for multiple configurations are independent. If configuration 1 is configured on slot k and configuration 2 is configured on slot k+1, the first SR transmission may be performed on slot k and the SR repetition may be performed on configuration 2 on slot k+1. Therefore, the overall latency may be further reduced.

Additionally or alternatively, additional SR configurations and/or additional resources for SR transmission may not have to be configured, but, for instance, high priority logical channels may utilize the SR configuration/resources of a lower priority logical channel for repetition.

Figure 19:
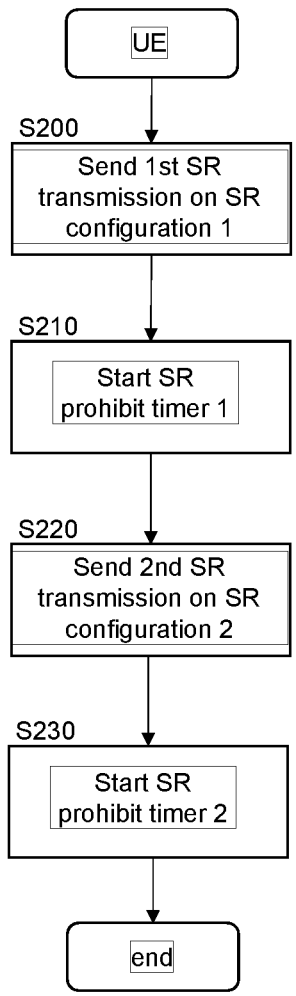
FIG. 19 is a flowchart illustrating transmission of a scheduling request on multiple opportunities according to two scheduling request configurations according to an embodiment.

FIG. 19 is a flowchart illustrating transmission of repeating a scheduling request on a MAC layer by instructing a transceiver to transmit the scheduling request on multiple opportunities according to an embodiment. The UE MAC layer entity may be configured to perform SR repetition according to two SR configurations, for instance, via RRC message. In step S200, a first SR transmissions according to the first SR configuration is triggered on the UE MAC layer. Further, in step S210, the first SR prohibit timer is started. Next, in step S220, the MAC layer triggers a second SR transmission according to the second SR configuration. Subsequently, in step S230, the second SR prohibit timer is initiated. As long as a SR prohibit timer has not expired, the UE MAC layer entity does not trigger SR transmission according to a respective SR configuration. When a SR prohibit timer has expired and no uplink grant has been received from the scheduling device, the UE MAC layer again triggers SR transmission according to the respective SR configuration.

Repetition Based on Multiple SR Configurations per LCH with Delayed Prohibit Timer Initiation In some embodiments, the scheduling device 210 may configure an allowable (maximum) number N of SR transmissions per logical channel, wherein each logical channel is mapped to multiple SR configuration.

Figure 20:
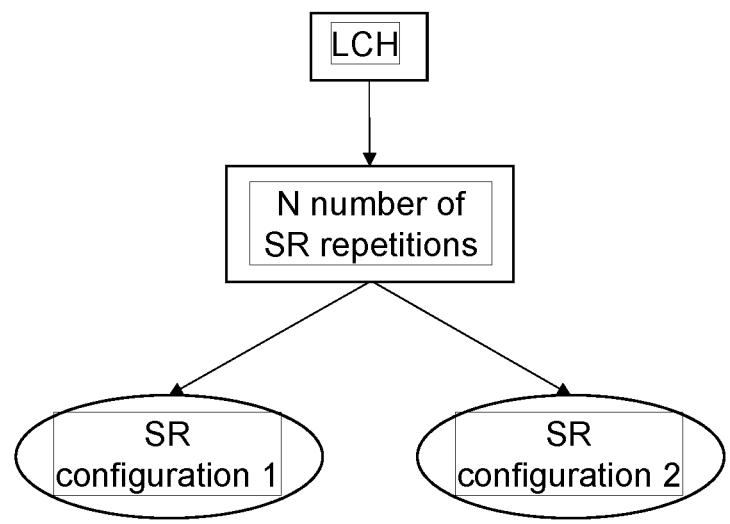
FIG. 20 illustrates a logical channel mapped to two SR configurations with a configured number of SR repetitions.

For instance, as shown in FIG. 20, a LCH is mapped to two SR configurations indicated as configurations 1 and 2. In other words, multiple opportunities for SR transmission are provided via multiple SR configuration per logical channel and SR repetitions are based on the different SR configurations and the number N of SR transmissions.

A logical channel configuration element indicating a configuration of LCH according to the embodiment is illustrated in the following as well as in FIG. 21.

| LogicalChannelConfig Information Element | |
| --- | --- |
| LogicalChannelConfig ::= | SEQUENCE { |
| ul-SpecificParameters | SEQUENCE { |
| priority | INTEGER (1..16), |
| prioritisedBitRate | ENUMERATED {kBps0, kBps8, kBps16, kBps32, kBps64, kBps128, kBps256, kBps512, kBps1024, kBps2048, kBps4096, kBps8192, kBps16384, kBps32768, kBps65536, infinity}, |
| bucketSizeDuration | ENUMERATED {ms5, ms10, ms20, ms50, ms100, ms150, ms300, ms500, ms1000, spare7, spare6, spare5, spare4, spare3,spare2, spare1}, |
| allowedServingCells | SEQUENCE (SIZE (1..maxNrofServingCells-1)) OF ServCellIndex OPTIONAL, -- PDCP-CADuplication |
| allowedSCS-List | SEQUENCE (SIZE (1..maxSCSs)) OF SubcarrierSpacing OPTIONAL, -- Need R |
| maxPUSCH-Duration | ENUMERATED {ms0p02, ms0p04, ms0p0625, ms0p125, ms0p25, ms0p5, spare2, spare1 } OPTIONAL, -- Need R |
| configuredGrantType1Allowed | ENUMERATED {true} OPTIONAL, -- Need R |
| logicalChannelGroup | INTEGER (0..maxLCG-ID) OPTIONAL, -- Need R |
| schedulingRequestID1 | SchedulingRequestId1 OPTIONAL, -- Need R |
| schedulingRequestID2 | SchedulingRequestId2 |
| number of SR repetition | ENUMERATED (n1, n2, n3, n4, n5) |
| logicalChannelSR-Mask | BOOLEAN, |
| logicalChannelSR-DelayTimerApplied | BOOLEAN, |
| ..., | |

As indicated, a logical channel configuration may include multiple scheduling request configurations ("schedulingRequestID1," "schedulingRequestID2") as well as an allowable number of scheduling requests ("number of SR repetition"). The number of allowable SR repetitions per LCH and the mapping to more than one SR configurations may be configured by the scheduling device, e.g., gNB, in RRC.

Figure 22:
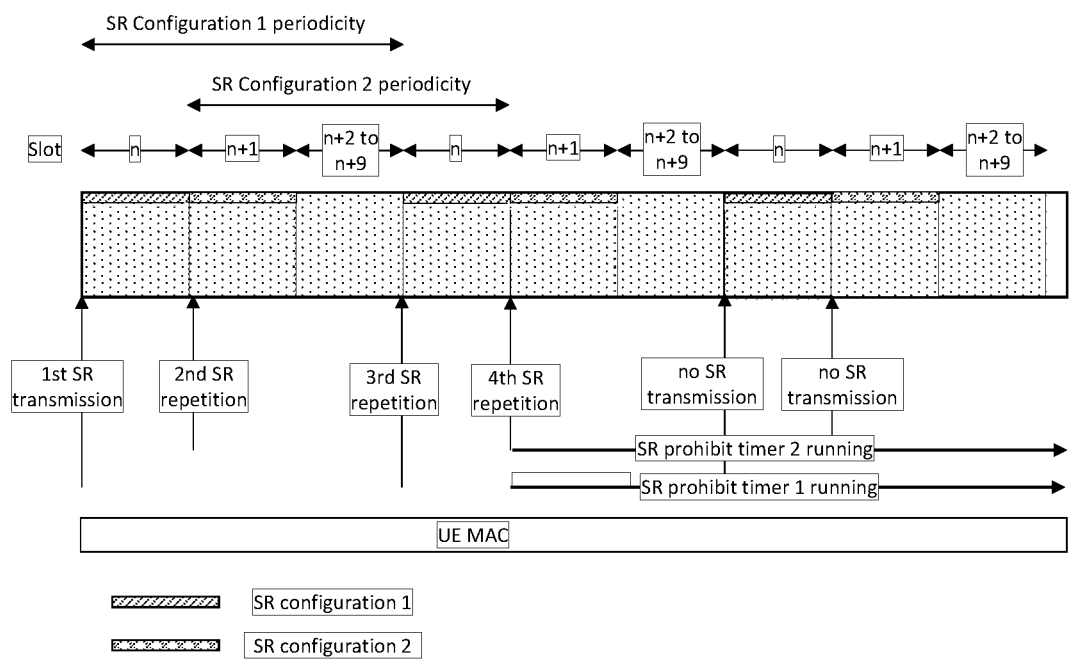
FIG. 22 is a schematic illustration of transmission of a scheduling request on opportunities triggered on a MAC layer according to an embodiment, wherein transmission of a scheduling request is triggered on opportunities according to two scheduling request configurations and a configured number of SR transmissions.

FIG. 22 is a schematic illustration of transmission of a scheduling request on multiple opportunities triggered by on the UE MAC layer according to an embodiment, wherein transmission of a scheduling request is instructed on multiple opportunities according to two scheduling request configurations and a configured number of SR transmissions. The total number of SR transmissions may be configured by the scheduling device via RRC message.

In particular, a first transmission of a scheduling request is triggered on the UE MAC layer according to the first SR configuration with associated first periodicity in slot n. Further, a second transmission of a scheduling request is triggered on the UE MAC layer according to the second SR configuration with associated second periodicity in slot n+1. Further, a third transmission of a scheduling request is triggered on the UE MAC layer according to the first SR configuration. Further, a fourth transmission of a scheduling request is triggered on the UE MAC layer entity to the second SR configuration.

In the example illustrated in FIG. 22, the allowable number of SR transmissions (repetitions) is four and the number of SR configurations per LCH is two.

After the number of transmitted SRs on multiple opportunities according to the two SR configurations, a first and a second SR prohibit timer are initiated (started). That is, both SR prohibit timers are started together after all four SR transmissions are sent. As long as an SR prohibit timer has not expired, SR transmission according to respective SR transmission configurations are not instructed on the UE MAC layer.

Alternatively, a SR prohibit timer may run per logical channel. Once all SR repetitions are sent, UE may initiate the SR prohibit timer.

In the example illustrated in FIG. 14, the number N of SR transmissions configured by the scheduling device is four. However, the present embodiment is not limited to four, and any number of SR transmissions may be configured by the scheduling device.

The present disclosure can be realized by software, hardware, or software in cooperation with hardware. Each functional block used in the description of each embodiment described above can be partly or entirely realized by an LSI (large scale integration) such as an integrated circuit (IC), and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/ telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

As described above, provided are devices and methods enabling robust transmission of scheduling requests without resulting in significantly higher overhead in Non-terrestrial networks (or similar wireless communication systems).

Provided is a transceiver device, comprising circuitry, which, in operation, repeats, on a medium access control, MAC, layer, a scheduling request by instructing a transceiver to transmit the scheduling request on a plurality of opportunities of a physical uplink control channel, PUCCH; and the transceiver, which, in operation, transmits the scheduling requests over the PUCCH.

In some embodiments, the circuitry, in operation, initiates a scheduling request prohibit timer, and does not instruct the transceiver to transmit the scheduling request in a case where the scheduling request prohibit timer is running In some embodiments, the transceiver, in operation, receives an allowable request indicator indicating an allowable number of scheduling requests; and the circuitry, in operation, initiates the scheduling request prohibit timer after the scheduling request has been transmitted on a number of opportunities equal to the allowable number of scheduling requests indicated by the allowable request indicator.

In some embodiments, the allowable request indicator indicates an allowable number of scheduling requests per logical channel.

In some embodiments, the transceiver, in operation, receives, via a physical downlink control channel, PDCCH, a resource allocation indicator indicating resources assigned to the transceiver device for the transmission; and the circuitry, in operation, determines the assigned resources according to the resource allocation indicator, and stops the scheduling request prohibit timer.

In some embodiments, the transceiver, in operation, receives a scheduling request configuration indicator indicating a plurality of scheduling request configurations, and the circuitry, in operation, instructs the transceiver to transmit the scheduling request on the plurality of opportunities according to the plurality of scheduling request configurations.

In some embodiments, the circuitry, in operation, initiates a plurality of scheduling request prohibit timers, each scheduling request prohibit timer being associated with one of the plurality of scheduling request configurations, and does not instruct the transceiver to transmit the scheduling request on an opportunity according to one of the plurality of scheduling request configurations in a case where the scheduling request prohibit timer associated with the one of the plurality of scheduling request configurations is running.

In some embodiments, the circuitry, in operation, initiates each scheduling request prohibit timer when the scheduling request according to one of the plurality of scheduling request configurations associated with the scheduling request prohibit timer is transmitted.

In some embodiments, the transceiver, in operation, receives an allowable request indicator indicating an allowable number of scheduling requests per logical channel; and the circuitry, in operation, initiates each scheduling request prohibit timer after the scheduling request has been transmitted on a number of opportunities according to the allowable number of scheduling requests indicated by the allowable request indicator.

In some embodiments, the transceiver, in operation, receives, via a physical downlink control channel, PDCCH, a resource allocation indicator indicating resources assigned to the transceiver device for the transmission; and the circuitry, in operation, determines the assigned resources according to the resource allocation indicator, and stops the plurality of scheduling request prohibit timers.

Further provided is a scheduling device, comprising circuitry, which, in operation, determines an allowable request indicator indicating an allowable number of scheduling requests; and a transceiver, which, in operation, transmits the allowable request indicator.

In some embodiments, the allowable number of scheduling requests are determined per logical channel.

In some embodiments, the allowable number of scheduling requests per logical channel may be determined according to a priority of a logical channel.

For example, the allowable number of scheduling requests of a high priority logical channel may be determined larger than an allowable number of scheduling requests of a lower priority logical channel. That, is, the allowable number of scheduling requests per logical channel may be determined according to a priority of the logical channel.

In some embodiments, the allowable request indicator indicates an allowable number of scheduling requests per logical channel.

In some embodiments, the transceiver, in operation, receives a scheduling request on an opportunity of a physical uplink control channel, PUCCH, and transmits, via a physical downlink control channel, PDCCH, a resource allocation indicator indicating resources assigned to the transceiver device for the transmission.

Further provided is a scheduling device, comprising circuitry, which, in operation, determines a scheduling request configuration indicator indicating a plurality of scheduling request configurations; and a transceiver, which, in operation, transmits the scheduling request configuration indicator.

In some embodiments, the number of scheduling request configurations is determined per logical channel.

In some embodiments, the al number of scheduling request configurations may be determined according to a priority of a logical channel.

For example, the number of scheduling request configurations of a high priority logical channel may be determined larger than a number of scheduling request configurations of a lower priority logical channel. That, is, the number of scheduling request configurations may be determined according to a priority of the logical channel.

In some embodiments, the transceiver, in operation, receives a scheduling request on an opportunity of a physical uplink control channel, PUCCH, and transmits, via a physical downlink control channel, PDCCH, a resource allocation indicator indicating resources assigned to the transceiver device for the transmission.

Further provided is a method, comprising repeating, on a medium access control, MAC, layer, a scheduling request by instructing a transmission of the scheduling request on a plurality of opportunities of a physical uplink control channel, PUCCH; transmitting the scheduling requests over the PUCCH.

In some embodiments, the method comprises initiating a scheduling request prohibit timer, and not instructing a transmission the scheduling request in a case where the scheduling request prohibit timer is running In some embodiments, the method comprises receiving an allowable request indicator indicating an allowable number of scheduling requests; initiating the scheduling request prohibit timer after the scheduling request has been transmitted on a number of opportunities equal to the allowable number of scheduling requests indicated by the allowable request indicator.

In some embodiments, the allowable request indicator indicates an allowable number of scheduling requests per logical channel.

In some embodiments, the method comprises receiving, via a physical downlink control channel, PDCCH, a resource allocation indicator indicating resources assigned to the transceiver device for the transmission; and determining the assigned resources according to the resource allocation indicator, and stopping the scheduling request prohibit timer.

In some embodiments, the method comprises receiving a scheduling request configuration indicator indicating a plurality of scheduling request configurations, and instructing transmission of the scheduling request on the plurality of opportunities according to the plurality of scheduling request configurations.

In some embodiments, the method comprises initiating a plurality of scheduling request prohibit timers, each scheduling request prohibit timer being associated with one of the plurality of scheduling request configurations, and not instructing transmission of the scheduling request on an opportunity according to one of the plurality of scheduling request configurations in a case where the scheduling request prohibit timer associated with the one of the plurality of scheduling request configurations is running.

In some embodiments, the method comprises initiating each scheduling request prohibit timer when the scheduling request according to one of the plurality of scheduling request configurations associated with the scheduling request prohibit timer is transmitted.

In some embodiments, the method comprises receiving an allowable request indicator indicating an allowable number of scheduling requests per logical channel; and initiating each scheduling request prohibit timer after the scheduling request has been transmitted on a number of opportunities according to the allowable number of scheduling requests indicated by the allowable request indicator.

In some embodiments, the method comprises receiving, via a physical downlink control channel, PDCCH, a resource allocation indicator indicating resources assigned to the transceiver device for the transmission; and determining the assigned resources according to the resource allocation indicator, and stopping the plurality of scheduling request prohibit timers.

Further provided is a method, comprising determining an allowable request indicator indicating an allowable number of scheduling requests; and transmitting the allowable request indicator.

In some embodiments, the allowable number of scheduling requests are determined per logical channel.

In some embodiments, the allowable number of scheduling requests per logical channel may be determined according to a priority of a logical channel.

For example, the allowable number of scheduling requests of a high priority logical channel may be determined larger than an allowable number of scheduling requests of a lower priority logical channel. That, is, the allowable number of scheduling requests per logical channel may be determined according to a priority of the logical channel.

In some embodiments, the allowable request indicator indicates an allowable number of scheduling requests per logical channel.

In some embodiments, the method comprises receiving a scheduling request on an opportunity of a physical uplink control channel, PUCCH, and transmitting, via a physical downlink control channel, PDCCH, a resource allocation indicator indicating resources assigned to the transceiver device for the transmission.

Further provided is a method, comprising determining a scheduling request configuration indicator indicating a plurality of scheduling request configurations; and transmitting the scheduling request configuration indicator.

In some embodiments, the number of scheduling request configurations is determined per logical channel.

In some embodiments, the al number of scheduling request configurations may be determined according to a priority of a logical channel.

For example, the number of scheduling request configurations of a high priority logical channel may be determined larger than a number of scheduling request configurations of a lower priority logical channel. That, is, the number of scheduling request configurations may be determined according to a priority of the logical channel.

In some embodiments, the method comprises receiving a scheduling request on an opportunity of a physical uplink control channel, PUCCH, and transmitting, via a physical downlink control channel, PDCCH, a resource allocation indicator indicating resources assigned to the transceiver device for the transmission.

The invention claimed is:

1. A transceiver device, comprising: circuitry, which, in operation, repeats, on a medium access control (MAC) layer, a scheduling request by instructing a transceiver to transmit the scheduling request on a plurality of opportunities of a physical uplink control channel (PUCCH); and the transceiver, which, according to an allowable request indicator, transmits the scheduling requests over the PUCCH, wherein the allowable request indicator indicates a total number of scheduling requests allowed by a plurality of scheduling request configurations per logical channel, wherein the circuitry, in operation, initiates a plurality of scheduling request prohibit timers, each scheduling request prohibit timer being associated with one of the plurality of scheduling request configurations, and does not instruct the transceiver to transmit the scheduling request on an opportunity according to one of the plurality of scheduling request configurations in a case where the scheduling request prohibit timer associated with the one of the plurality of scheduling request configurations is running.

2. The transceiver device according to claim 1, wherein the transceiver, in operation, receives a scheduling request configuration indicator indicating the plurality of scheduling request configurations.

3. The transceiver device according to claim 1, wherein the circuitry, in operation, initiates each scheduling request prohibit timer when the scheduling request according to one of the plurality of scheduling request configurations associated with the scheduling request prohibit timer is transmitted.

4. The transceiver device according to claim 1, wherein, the transceiver, in operation, receives the allowable request indicator-indicating-an allowable number-of scheduling-requests-per-logical channel; and the circuitry, in operation, initiates each scheduling request prohibit timer after the scheduling request has been transmitted on a number of opportunities according to the-allowable total number of scheduling requests indicated by the allowable request indicator.

5. The transceiver device according to claim 1, wherein the transceiver, in operation, receives, via a physical downlink control channel (PDCCH), a resource allocation indicator indicating resources assigned to the transceiver device for the transmission; and the circuitry, in operation, determines the assigned resources according to the resource allocation indicator, and stops the plurality of scheduling request prohibit timers.

6. A scheduling device, comprising:

circuitry, which, in operation, determines an allowable request indicator indicating an allowable number of scheduling requests; and a transceiver, which, in operation, transmits the allowable request indicator, wherein the allowable request indicator indicates a total number of scheduling requests allowed by a plurality of scheduling request configurations per logical channel, and wherein a plurality of scheduling request prohibit timers are associated with the plurality of scheduling request configurations, and the scheduling request is not transmitted on a opportunity according to one of the plurality of scheduling request configurations in a case where the scheduling request prohibit timer associated with the one of the plurality of scheduling request configurations is running.

7. A method comprising: repeating, on a medium access control (MAC) layer, a scheduling request by instructing a transceiver to transmit the scheduling request on a plurality of opportunities of a physical uplink control channel (PUCCH);

transmitting the scheduling requests over the PUCCH according to an allowable request indicator, wherein the allowable request indicator indicates a total number of scheduling requests allowed by a plurality of scheduling request configurations per logical channel;

initiates a plurality of scheduling request prohibit timers, each scheduling request prohibit timer being associated with one of the plurality of scheduling request configurations, and not instructing the transceiver to transmit the scheduling request on an opportunity according to one of the plurality of scheduling request configurations in a case where the scheduling request prohibit timer associated with the one of the plurality of scheduling request configurations is running.

\* \* \* \* \*